SELF-COMMUTATING ROTOR WITH SCREEN DISC

Filed Dec. 11, 1962 4 Sheets-Sheet 1

March 22, 1966 R. FAVRE 3,242,404

SELF-COMMUTATING ROTOR WITH SCREEN DISC

Filed Dec. 11, 1962 4 Sheets-Sheet 4

United States Patent Office 3,242,404

Patented Mar. 22, 1966

3,242,404
SELF-COMMUTATING ROTOR WITH SCREEN DISC

Robert Favre, Lausanne, Switzerland, assignor to Fabriques Movado, La Chaux-de-Fonds, Switzerland, a corporation of Switzerland Filed Dec. 11, 1962, Ser. No. 243,893
Claims priority, application Switzerland, Dec. 27, 1961, 14,985/61
11 Claims. (Cl. 318—138)

This invention relates to an electro motor, more particularly a direct current motor comprising at least one exciting winding, which is supplied through at least one electronic output stage.

Motors of this type in which a rotating field driving a diametrically magnetised rotor is produced by electronic commutation, are already known. In such motors there are arranged in addition to the exciting windings in the stator, control windings in which signals are induced on passing of the rotor. These signals are amplified and supplied to the exciting windings.

In these known motors, however, self-starting is not possible, so that they must be provided with an additional starter device.

Electronically controlled motors are also already known which likewise work with a rotating field circulating in the stator, this rotating field being produced by a commutator circuit, which however requires a special supply source on the one hand and an independant control device on the other hand.

In U.S. patent application Serial No. 58,763 it has also already been proposed to control a direct current motor by means of a commutator, which comprises a disc rigidly connected to the rotor of the motor and having at least one notch, the arrangement being such that as the notch passes a control member, the latter is excited and renders conductive an electronic amplifier, which in turn ensures excitation of the stator winding.

The object of the present invention is to provide a simply constructed motor having electronic commutation, which works preferably with a single-phase stator, can achieve high speeds and is self-starting.

The electro motor according to the invention is characterised by the feature that the controlling of the output stage ensures self-starting of the motor from any resting position of the rotor, in that at least one commutator provided with at least one control zone and effective at least during the starting time of the motor renders conductive by a control signal that output stage supplying the zone of the exciting winding producing a torque on the rotor, as long as the rotor is in the working range of the winding zone in question.

The invention is described in more detail with reference to the drawings, in which.

Figure 1:
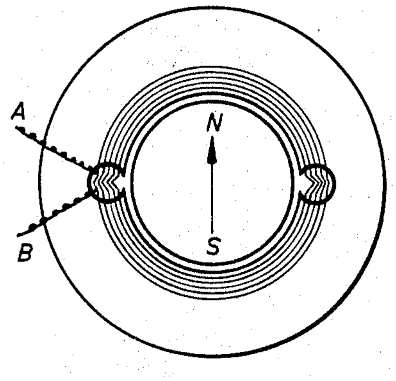
FIGURE 1 is the diagram of a single-phase motor with double-pole stator carrying the exciting winding and double-pole rotor.
Figure 2:
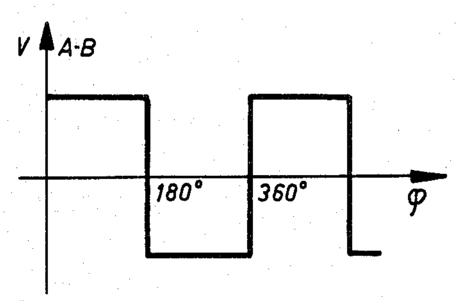
FIGURE 2 shows the theoretical ideal voltage curve at the terminals A–B of the coil of the motor according to FIGURE 1.

In FIGURE 1 there is shown a single phase motor with a double-pole stator and a double-pole rotor, the rotor being diametrically magnetised and having the poles N and S. In order to achieve that the voltage curve in the stator winding approximates as far as possible to the theoretic rectangular form shown in FIGURE 2 and that dead zones are thus avoided as far as possible, the rotor is magnetised as homogenously as is practicable, and the poles of the stator have a semi-circular pole surface of approximately 180°. The demagnetising of the stator takes place instantaneously in each case when the magnetic axis of the rotor moves through the angle-bisecting plane of the stator pole surfaces.

Figure 3:
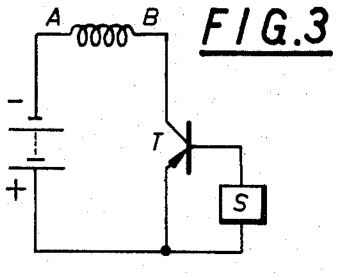
FIGURE 3 is a basic circuit diagram for the supplying of the motor according to FIGURE 1.

FIGURE 3 shows the basic circuit diagram for supplying the stator winding according to FIGURE 1. Through the commutator S, the forms of design of which will be explained in more detail further on, the power transistor T is always switched into the conductive state, when the voltage induced by the rotation of the rotor at the terminal B of the stator winding is positive. The induction current then supplied by the battery to the stator winding imparts a torque to the rotor during the next semi-rotation of approximately 180°. In the circuit according to FIGURE 3, however, it is not yet possible to cause an acceleration moment to be effective on the rotor during the other 180° rotation also.

Figure 4:
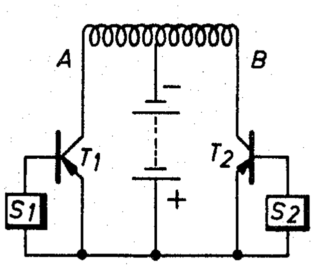
FIGURE 4 is an extended circuit diagram for the supplying of the motor according to FIGURE 1.

This disadvantage is removed by a circuit according to FIGURE 4. According to FIGURE 4 the stator winding is excited by way of a central tapping by two output stages each controlled by a commutator, so that the induction current flows alternatively from the middle of the winding to a terminal A and then, after a half rotation of the rotor, from the middle of the winding to the other terminal B. In this way it is made possible for the motor to be accelerated alternatively by both winding halves during approximately both 180° half rotations. In the finite narrow zones of the voltage reversal, which cannot be avoided in practice, no driving torque is present.

Figure 5:
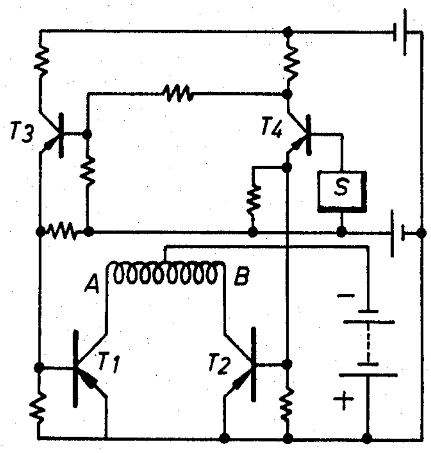
FIGURES 5 to 8 are extended variants of the circuit diagram according to FIGURE 4.

FIGURE 5 shows a variant of the circuit according to FIGURE 4, in which only the one output stage containing the output or power transistor T2 is controlled by a commutator S. Both power transistors T1 and T2 are coupled through a sweep circuit ("flip flop" circuit) containing the two transistors T3 and T4 so that in each case the transistor T3 and hence the output transistor T1 is blocked, when the transistor T4 and hence the output transistor T2 are switched into the conductive state by the commutator, whilst the transistors T3 and T1 carry the current when the transistors T4 and T2 are blocked. By a suitable selection of the supply voltages as well as the initial voltages for the transistors T3 and T4 it is possible that in those moments both output transistors T1 and T2 remain blocked, when the rotor moves through the said inversion angle 180°, 360°, etc. (see FIGURE 2).

Figure 6:
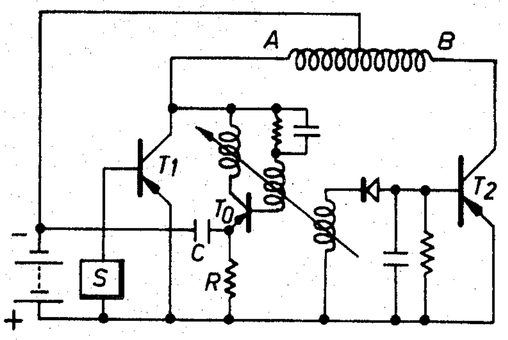

In a variant of this circuit as shown in FIGURE 6, the blocking of the output transistor during the conductive state of transistor T1 is achieved by an auxiliary oscillator containing the auxiliary transistor T0. The high frequency oscillator formed by the transistor T0 remains unexcited, as long as the output transistor T1 controlled by the commutator S is conductive, but begins to oscillate, as soon as, because of blocking of the transistor T1, the voltage at the emitter collector path of the transistor T1 rises. The windings of the oscillator circuit are coupled with a coil located in the basic circuit of the output transistor T2, so that the output transistor T2 remains blocked as long as the oscillator is not excited but becomes conductive however when through excitation of the oscillator its basic circuit is controlled. Through the condenser C and the resistance R in the emitter circuit, of the transistor T0, a suffiicently great time constant is achieved so that the oscillator is excited only in the upper part of the voltage half wave, in which the terminal A of the stator winding has a negative potential, so that output transistor T2 becomes conductive at the favourable moment to impart an optimum torque to the motor. Naturally the same result can also be achieved with other circuits well known to the expert.

Figure 7:
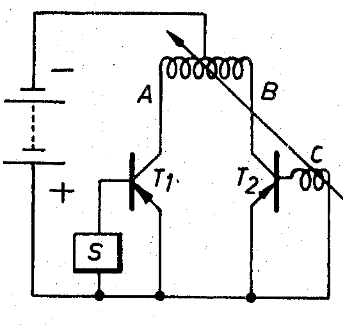

FIGURE 7 shows a further variant of an amplifier circuit which operates with two output or power transistors and only one commutator. According to this circuit the output transistor T2 is only put into the conductive state when the rotor speed is high enough to induce a sufficiently great voltage in the control winding C arranged on the stator winding and located in the basic circiut of the transistor T2.

Figure 8:
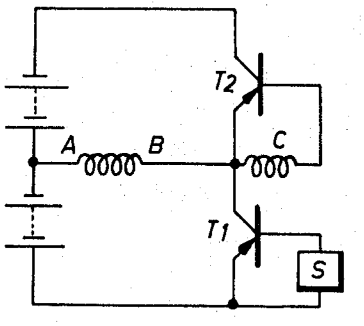

In the circuit according to FIGURE 8 the single stator winding with the terminals A–B is supplied without a central tapping, whereby during each excitation phase the whole number of windings in the coil is utilised. Both output transistors T1 and T2 are each supplied by a voltage source, only the transistor T1, however, being controlled by the commutator S, whilst the controlling of the output transistor T2 is carried out by means of the control coil C as in the case of the circuit according to FIGURE 7. Demagnetising of the stator winding takes place in each case after one half rotation of the rotor.

The circuits shown in FIGURES 4, 5 and 6 can naturally also be applied to the principle of the circuit according to FIGURE 8.

Figure 9:
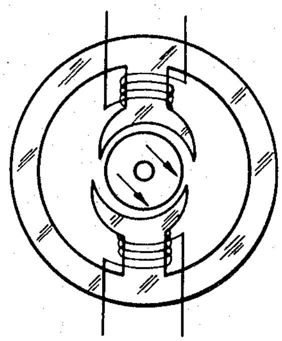
FIGURE 9 shows a motor having a specially designed stator surfaces, by which the resting positions of the rotor in the dead zones are prevented.

FIGURE 9 shows a motor, the two semi circular stator pole surfaces of which are located eccentrically to one another and with respect to the rotor, so that a resting position of the rotor within a dead zone is avoided. In the illustration according to FIGURE 9, the rotor will therefore always occupy a resting position, in which its magnetic axis is located obliquely to the magnetic axis of the stator poles.

Figure 10:
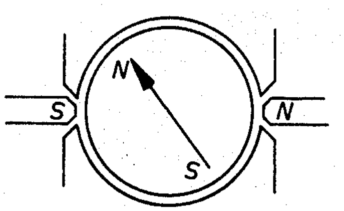
FIGURE 10 is a variant of a motor according to FIGURE 9.

FIGURE 10 shows another arrangement, which likewise prevents a resting position of the rotor within a dead zone. In the small gaps between the pole shoes of the stator poles are arranged small ferrite magnets, one of which has its south pole directed towards the rotor and the other of which has its north pole so directed. This method also ensures that in the resting position of the rotor, its magnetic axis never coincides with the magnetic axis of the stator poles. In conjunction with the above described control circuits self-starting is thus ensured in any event in the case of these motors according to FIGURES 9, and 10.

Figure 11:
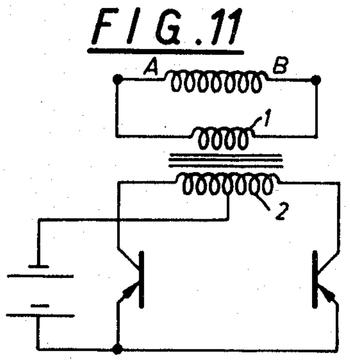
FIGURE 11 is a circuit diagram for the supplying of the motor by way of a transformer.

In the circuit according to FIGURE 11 the output stages, which are only shown diagrammatically, feed the primary coil 1 of a transformer, in the secondary circuit of which the stator winding with the terminals A and B is in series with the secondary winding 2 of the transformer.

This embodiment of a circuit is particularly of interest, if an exciting voltage galvanically uncoupled from the output stage is required for the motor, or if it is wished to make the voltages of the source of supply voltage and the exciting voltage for the motor independent of one another or to provide a regulation of the speed of the motor.

The motors described up till now and their circuits are only of interest, if no great load moment has to be overcome during the starting of the motor, as the extent of the acceleration moment imparted to the stationary rotor depends on its resting positions and in certain positions may be only very small, moreover there is the risk that the rotor, if it is displaced for any reason from its resting position after running down, may run in the reverse direction when the motor is again switched on.

Figure 12:
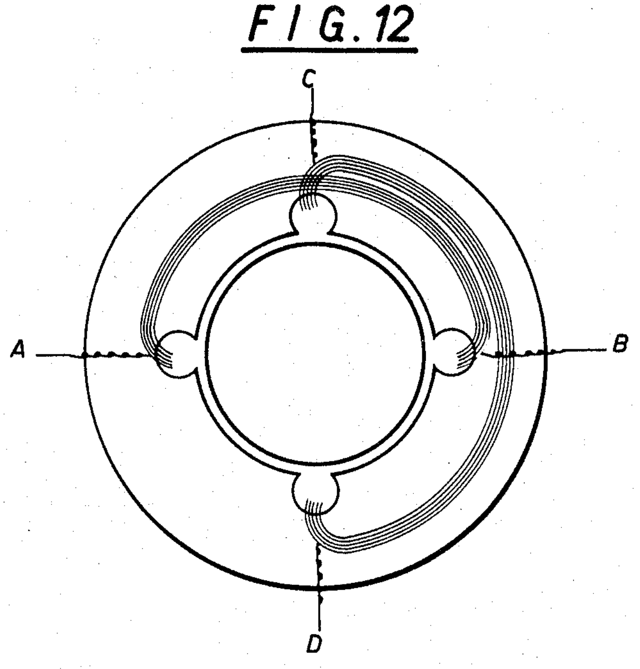
FIGURE 12 is a diagram of a motor with two-phase stator and overlapping stator windings.

In order to ensure that the motor also runs with certainty in a specific direction of rotation and starts itself even under load, there is proposed according to the invention a multi-phase stator, more particularly a two-phase stator, as shown diagrammatically in FIGURE 12. According to this the stator winding consists of two coils with the connecting terminals A and B, C and D, each of the two coils extending over an angle of approximately 180° and both coils over lapping within an angular range of approximately 90°. As shown in FIGURE 12, the stator is then designed with four poles. A rotor of this type shown in FIGURE 12 may be operated according to the invention with a circuit according to FIGURES 4, 5 and 6, the two stator coils according to FIGURE 12 then taking the place of the two half windings of a single stator coil supplied according to these circuits.

In order to ensure reliable self-starting from all resting positions of the rotor even under load, it is further proposed according to the invention to use instead of one motor with a multi-phase structure, several single-phase motors, more particularly two motors, the rotors of which are arranged on a common shaft in phase displacement to one another, so that in any resting position of the shaft, at least one of the rotors is situated outside its dead zone.

Such systems built up from single-phase motors have considerable advantages which will become clear from the following considerations.

For motors of very high speed a magnetic material with only very low losses is preferably used, which allows only a relatively small induction, which is often even lower than that of a permanent magnet. It is therefore of great importance to design the magnetic circuit of the stator with as large as possible pole surfaces, which precisely in a single-phase structure may reach a maximum value, with a reduction of the number of pole intervals to a minimum, the very undesirable eddy currents in metal rotors with high speed are simultaneously also reduced to a minimum. Moreover it is possible in a motor with single-phase structure to effect the magnetising of the rotor only in the mounted state by a powerful current which is passed through the winding A–B. In a multi-phase stator a corresponding number of pole intervals would be formed during the magnetising. Such a magnetising process after mounting is also favoured by the said construction of as large as possible pole surfaces.

To avoid eddy currents the rotor is preferably composed of magnetic sheets made from a suitable alloy.

A further advantage of the design of the stator poles according to the invention consists in that owing to the very small pole intervals, the length of the stator can be kept relatively small, so that several single-phase stators of this kind for forming the said motor system can be arranged next to one another without requiring much space.

Moreover single-phase stators are particularly suitable for being cut in along a radial plane located perpendicularly to the polar axis, which permits a simple embedding of the prefabricated coils in these indentations and hence a considerable reduction in the external dimensions of the motor.

The circuits explained with reference to the figures so far operate with transistors.

According to the invention these circuits may also be equipped with controlled semi-conductor diodes (4 layer triodes) of the type of the solid body thyratron. In circuits according to FIGURES 4, 5 and 7, for example, the output transistors may be replaced by such 4 layer triodes. The blocking of one diode during the conductive state of the other diode is achieved, for example, by a suitable capacitor, which is connected in parallel with the coil between the terminals A and B. In order to avoid a short circuit arising on reversal of the induced voltage, as of course one of the diodes is conductive, if the induced voltage has approximately the value 0, a throttle coil is placed in the common supply pipe of both output stages, which coil takes up the short circuiting energy and leads to the stator circuit again. Such a throttle also assists at the same time the blocking of which ever diode is first conductive.

The commutators containing one control zone which take over the control of the output stages and are designated in the diagrams described up till now by S, consist according to the invention of a transmitter member and a control member, the transmitter member only being able to excite the control member, when a screen preferably designed as a disc which is rigidly connected with the rotor and moves between the transmitter member and the control member, is situated with its control zone between the two said members.

Figure 13:
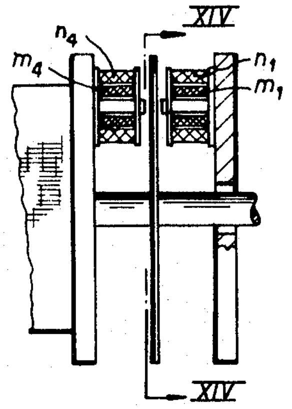
FIGURE 13 is a side view of an electro-magnetically working commutator.
Figure 14:
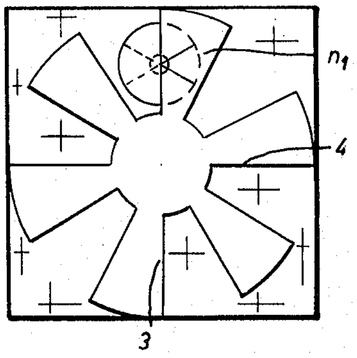
FIGURE 14 is a top plan view of the surface along the line XIV–XIV of FIGURE 13.

FIGURES 13 and 14 show by way of example the electromagnetic switching means, which in FIGURES 3 to 8 are denoted by S1 and S2 respectively.

Figure 15:
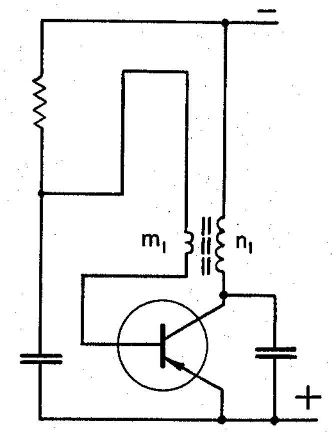
FIGURE 15 is a circuit diagram for a high frequency supplying of the commutator according to FIGURES 13 and 14.
Figure 17:
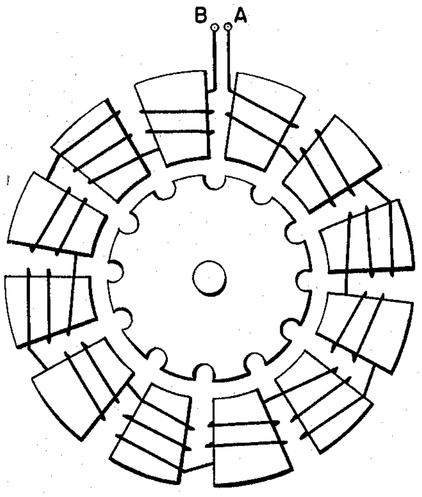
FIGURE 17 shows a twelve-polar motor according to the invention having a equal number of stator and rotor poles.

The transmitter elements consists of the coil $n_1$, which is constantly excited with high frequency current by a transistor oscillator according to FIGURE 15 and the control member consists of the control coil $n_4$. Between the said pair of coils, there is a rotatable screening disc 3 (FIGURE 14) rigidily connected to the rotor, which in the embodiment according to FIGURE 14 belongs to a motor shown in FIGURE 17 as having six pole pairs on the rotor as well as on the stator winding A–B which is inserted in a control circuit like that of FIGURES 8 or 11. In the arrangement shown in FIGURE 17, the rotor consists of permanent magnet poles and the stator winding is monophase, i.e. all the coils of stator poles are connected in series, the direction of winding being, however, reversed from pole to pole, so that alternating stator poles of different polarity are formed.

Accordingly the screening disc 3 has, as control zones, six recessed sectors 4 each of which has an extent of approximately 30°. On rotation of the rotor and hence of the disc 3, the stator winding is excited in one direction whenever one of the control zones 4 passes between coil $n_1$ and coil $n_4$, thereby coupling these coils inductively. Hence, all six stator pole pairs are periodically excited simultaneously when the south poles or north poles of the rotor approach the north pole or south poles, respectively, of the stator.

When the inductive coupling of the coils $n_1$ and $n_4$ is interrupted, that is when a sector of the disc 3 passes between these coils, the stator winding will be excited in the other direction by one of the switching means described in connection with FIGURES 8 or 11. It is also possible to use for this purpose a flip-flop means according to FIGURE 5 by which the exciting current through the winding A–B in FIGURE 8 is reversed.

In the example according to FIGURE 13, the control coil $n_4$ is moreover, in accordance with a further inventive idea, coupled with a resonance circuit including coil $n_4$, which is tuned to the frequency of the oscillator supplying the transmitter coil (FIGURE 15). In this way, the signal induced in the control coil $n_4$, upon passage of a recess of conductive disc 3 between the control coil and the transmitter coil, is considerably amplified.

Figure 16:
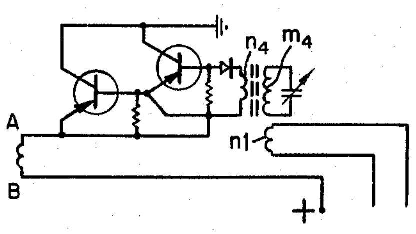
FIGURE 16 shows an amplifier circuit for the signal for exciting the stator windings A–B given by a commutator according to FIGURES 13 and 14.

In FIGURE 16 there is indicated the circuit of a power stage, which operates with a preliminary and an output transistor. The signal produced and rectified in the basic circuit of the preliminary transistor by the control coils is used to control the output transistor connected in series, which in turn excites the stator winding A–B in question. The supply source of direct current voltage for the motor according to FIGURE 16 may be the same supply source as supplies the transistor oscillator according to FIGURE 15.

Instead of the types of commutators so far described, commutators working on a different principle may also be used within the scope of the invention. They may, for example, work on the basis of the inductive transmitters known per se; they may also work with a capacitive coupling, in which the capacity of a condenser is varied; they may work on the basis of a variable reluctance, or, for example, radio-active rays may also be used instead of the photo-electric means described.

In particular, according to a further inventive idea, the control member for the commutator may be a resonance generator, which is in particular influenced directly by the magnetic field of the rotor. In this case the rotor itself takes over the role of the transmitter member.

Such a multi-polar motor, in which the number of poles naturally need not be restricted to the number of twelve as illustrated, has the great advantage that high torques can be reached, because, as is known, the torque of the motor increases with the number of pairs of poles. Whereas in conventional motors an increase in the number of pairs of poles is bound up with a correspondingly complicated structure of the collector, which restricts the number of pole pairs that can be achieved in practice, a multi-polar motor according to the invention merely requires that the aforementioned screening disc, which effects the control of the excitation by way of an output stage, is provided with as many recesses or control zones as the motor has pairs of poles.

To achieve self-starting, one may, as already mentioned, either arrange at least two such rotors staggered with respect to one another by a suitable angle or a common shaft within the common stator, so that one of the rotors is always outside the dead zone, or make the multi-polar motor according to FIGURE 27 three-phase, for example. In this case there are, as likewise already described, provided three output stages (one for each phase), each screen disc having as many recesses or control zones as the corresponding stator phase has pairs of poles. In a twelve-pole motor according to FIGURE 27, for example, with three-phase stator construction, each phase would have two pairs of poles, which alternate in an appropriate cyclic manner with the poles of the other phases. Every third stator pole would then belong to the same stator phase.

The multi-polar motors mentioned are of particular interest if it is desired to obtain high torques with relatively low speeds. As stated, the same multi-polar assembly in conventional direct current motors could only be obtained at the price of multiplying the number of pairs of brushes and of a very complicated collector per se, one collector ring is then provided the peripheral speed of the rotor, one will in a motor according to the invention select a rotor with as large a diameter as possible. Were one to design such a rotor with only two poles, then it would be necessary in order to obtain a good path for the magnetic flux, to make the stator poles correspondingly thick. However, this thickness, which is preferably in inverse proportion to the number of poles, is simultaneously reduced by selecting as large a number of pole pairs as possible in accordance with the invention. In practice the number of pole pairs is restricted merely by the critical frequency at which modern magnetic plates can have their magnetism reversed. As such an upper limit for the frequency of magnetic reversal one may consider a frequency of 200 Hz. when using the magnetic plates obtainable on the present-day market.

A numerical example will now be given to illustrate the advantages of a multi-polar motor according to the invention;

Let it be assumed that one wishes to make a motor of one kilowatt with a speed of 1200 revolutions per minute (i.e. 20 revolutions per second). With a critical frequency of magnetic reversal of 200 Hz., one may therefore operate with a maximum of 20 poles. A conventional collector motor with such a high number of poles would not be able to be manufactured in practice for this power. For a motor according to the invention, however, there are no difficulties in designing stator and rotor with 20 poles each, because, as has already been mentioned, the number of electronic power stages for controlling the excitation is completely independent of the number of poles. It is only the number of recesses or the number of control zones on the screening discs or discs that has to be altered.

In a motor with the electronic commutation according to the invention, a rotor of 15 centimeters $\phi$, for example can be selected, so that each pole has a curved pole surface of approximately 25 millimeters, the width of the pole coils being able to amount to approximately 8 to 10 millimeters. In the windows between the stator poles approximately 200 ampere windings with a current density of 3 amperes per square millimeter can be accommodated. In this way 4,000 ampere windings are installed altogether, which with a desired power of one kilowatt makes a voltage of 0.25 volt per winding necessary. According to the induction formula, one therefore calculates, assuming an induction of 25,000 Gauss, a thickness of the bundle of sheets of approximately 3 centimeters.

The bundles of sheets of this thickness may, in order to achieve self-starting with monophase stator construction in the method and manner already described, be subdivided into two groups each of 1.5 centimeters thick and staggered with respect to one another by a quater of a pole step.

If one takes into account the dimensions of the coils and the motor flanges, then the motor in question reaches a total length of only approximately 9 centimeters. The external diameter of this motor is then including the casing approximately 22 centimeters, if the poles are made approximately 2 centimeters long and the thickness of the stator yokes approximately 1 centimeter, the stator diameter itself being approximately 21 centimeters.

In alternative forms of the motor according to the invention, not shown, the permanent magnet rotor may also be replaced by an electro-magnetically magnetised rotor. Whereas motors with permanent magnet rotors are generally suitable for higher speeds with smaller powers (the torque naturally being able to be increased, as stated, by a suitably large number of pole pairs), electromagnetic rotors will be preferred in motors, which have to produce only small speeds at relatively high powers.

In electro-magnetically magnetised motors there is the advantage that owing to the good cooling, the rotor windings can be supplied with approximately three times greater current density than is the usual case.

In the numerical example considered above of a 20-pole motor, one may for example provide approximately 500 ampere windings per pole on the rotor. Such a rotor can moreover be provided with a central recess of approximately 8 centimeters $\phi$, aluminum blades increasing the air ventilation being able to be fixed on the shaft of the said rotor. In this way the entire surface of the rotor can be effectively cooled, particularly as the rotor coils are very small.

Of particular interest, moreover, is a further modification of the motor according to the invention, not shown, in which stator and rotor interchange their functions as carriers of the exciting winding and the permanent magnetic field, respectively. Since, as stated, windings located on the rotor can be extremely effectively cooled, the invention provides that for motors which have to produce a high power at relatively low speed, the exciting windings should be accommodated on the rotor. A considerably higher current density can then be used for the excitation than would be possible in the case of an exciting winding on the stator. In such a motor, the rotor of which carries the exciting windings, the cyclic excitation takes place by means of collector rings known per se, one collector ring is then provided for the common feeding of one end of all the exciting windings and a further collector ring for the separate feeding of each phase. In the case of three-phase excitation one would therefore have four collector rings each with one brush. Cyclic control of the excitation takes place in the manner already described for the stator windings by means of the electronic output stages and the commutators described. In conjunction with a stator now designed with permanent magnet poles, for example of ferrite, high powers with relatively small dimensions can now be obtained in such motors in spite of the low induction in the air gap owing to the high current density permissible in the exciting windings on the rotor. For example, in the manner described a one kilowatt motor can be built with the same dimensions as have been given in the above-mentioned numerical example.

In motors according to the invention, in which the rotor is electro-magnetically magnetised, it is easily possible to obtain the known characteristics of conventional motors, namely series wound, shunt and compound characteristics. For compound operation, for example, one provides three collector rings, the first of which takes over common feeding of the rotor windings, the second of which feeds the winding component in series and the third the winding component in parallel.

Motors having such a characteristic are particularly suitable for the controlling of machine tools and also as starting motors for automobiles. Such an automobile starter can be operated in parallel with the charging generator for the battery, by the induced voltage being rectified, this rectification being able to be carried out particularly effectively as the induced voltage is approximately squarewave.

The direct current motors having electronic commutation as described constitute sparkless motors which owing to this property are suitable especially for operation in areas subject to the risk of explosion, for example for driving fuel pumps or for general applications in mines. Moreover, very high speeds can be obtained with these motors. This property opens out wide ranges of application in the machining and processing art, for example for driving grinding and drilling machines, emulsifying machines and centrifuges, compressors, turbines or pumps. As the motors can be made in very small dimensions, they are even suitable for electric shaving appliances or also for teeth drilling machines. Owing to their high specific power weight, i.e., the ratio of horsepower to weight, other interesting applications are possible in vehicles and in the aircraft industry.

Electro motors which operate on the principle according to the invention have a speed which is proportional to the extent of the supply voltage. The rotor is accelerated until the voltages induced in the exciting windings have the same magnitude as the supply voltage. In this way as high speeds as desired can be achieved in principle and are restricted merely by mechanical factors (strength of the rotor stability of the bearings, etc.). By suitably selecting the rotor and stator material, electrical losses can be reduced to a minimum. Preferably Mu-metal or ferrite is used for the stator and permanent magnet plates or hard ferrite for the rotor.

There should be stated as further advantage of the motors according to the invention, that these motors can be controlled merely by switching on and off the exciting voltage for the control members described, which in particular facilitates remote control, for example by means of small switches in the lead. Moreover, this exciting voltage can be applied with a definite time constant adapted to the acceleration time of the motor, whereby overloading of the output transistors during the starting period is avoided.

What I claim:

1. An electric motor comprising a stator winding suitably mounted for generating a magnetic field inside a stator comprising a plurality of poles, a permanently magnetized rotor suitably mounted for rotation within said magnetic field, a source of direct current for energizing said stator winding to energize all of said stator poles simultaneously with neighboring poles having opposite polarity, a control circuit comprising switching means connecting said stator winding in selected positions of said rotor alternatively in the one and in the other current direction to said direct current source to energize said stator winding to generate an alternating magnetic field, whereby the polarity of each of said poles alternately changes its sign, and pickup means for receiving an electric current to control said switching means, said pickup means comprising a transmitter coil, means for supplying high frequency current to energize said coil, a control coil in said control circuit and in position to be excited by said transmitter coil but spaced therefrom and a screening disc rotating in synchronism with said rotor and disposed between said transmitter coil and control coil, said disc having at least one cutout portion permitting excitation of said control coil by said transmitter coil.

2. A motor as claimed in claim 1, in which said stator winding has a center tap to which said current source is connected and in which said switching means comprises two transistors each connected to control current flow through half of said winding and said pickup means comprises two pickup units, one connected in the base circuit of each of said transistors to control the conduction of the respective transistor.

3. A motor as claimed in claim 1, in which said control coil is connected with a resonant circuit tuned to the frequency of the transmitter coil.

4. A motor as claimed in claim 1, in which an exciter coil is arranged coaxially with said transmitter coil and in which said means for supplying high frequency current comprises an oscillator having an output connected with said exciter coil.

5. A motor as claimed in claim 1 in which said stator winding comprises two halves and said control circuit comprises a said pickup means controlling one half of said winding and a flip-flop means which energizes in turn the other half of said winding within the interval in which the first mentioned half of said winding is not energized.

6. A motor as claimed in claim 1, in which said control circuit comprises a said pickup means controlling one half of said stator winding and an oscillator controlling the other half of said winding and connected with the circuit of said one half so as to be activated in timed relation therewith.

7. A motor as claimed in claim 1, in which said control circuit comprises a said pickup means controlling one half of said rotor winding and a control coil controlling the other half of said winding, said control coil being located near the rotor so as to have a voltage induced therein by rotation of the rotor.

8. A motor as claimed in claim 1, in which said control circuit comprises means for cyclically reversing the direction of flow of current in said stator winding.

9. A motor as claimed in claim 1, in which said control circuit comprises a transformer having its secondary connected to said stator winding and with said switching means in its primary circuit.

10. A motor as claimed in claim 1, in which said poles comprises curved pole surfaces located eccentrically to one another and to the rotor to avoid resting of the rotor in a dead zone of the stator winding.

11. A motor as claimed in claim 1, in which permanent magnets are positioned between the stator poles and act on the rotor poles and act on the rotor to avoid its coming to rest in a dead center position.

References Cited by the Examiner

UNITED STATES PATENTS

| | | | |
|---|---|---|---|
| 2,837,670 | 6/1958 | Thomas et al. | 310—49 |
| 3,023,348 | 2/1962 | Cox | 318—138 |
| 3,025,443 | 3/1962 | Wilkenson et al. | 318—138 |
| 3,050,671 | 8/1962 | Moller | 318—138 X |
| 3,091,728 | 5/1963 | Hogan et al. | 318—254 |
| 3,134,220 | 5/1964 | Meisner | 318—138 X |

ORIS L. RADER, *Primary Examiner.*

S. GORDON, *Assistant Examiner.*